United States Patent [19]
Bottou et al.

[11] Patent Number: 6,144,767
[45] Date of Patent: Nov. 7, 2000

[54] EFFICIENT CONVOLUTIONS USING POLYNOMIAL COVERS

[75] Inventors: Leon Bottou, Highlands; Patrice Yvon Simard, Eatontown, both of N.J.

[73] Assignee: AT&T Corp, New York, N.Y.

[21] Appl. No.: 09/189,202

[22] Filed: Nov. 10, 1998

Related U.S. Application Data

[60] Provisional application No. 60/080,477, Apr. 2, 1998.

[51] Int. Cl.[7] .................................................. G06K 9/00
[52] U.S. Cl. ........................................ 382/209; 382/279
[58] Field of Search .................................. 382/209, 210, 382/211, 212, 213, 257, 279, 278, 280, 276

[56] References Cited

U.S. PATENT DOCUMENTS

| | | | |
|---|---|---|---|
| 5,384,867 | 1/1995 | Barnsley et al. | 382/249 |
| 5,875,108 | 2/1999 | Hoffberg et al. | 364/146 |

*Primary Examiner*—Bijan Tadayon
*Assistant Examiner*—Seyed Azararian

[57] ABSTRACT

Signal processing and pattern recognition is efficiently accomplished by using a plurality of low degree polynomials to approximate the images. The polynomials are then differentiated to obtain impulse functions. The impulse functions may be easily and efficiently convolved and the convolution subsequently integrated to extract the desired signal information.

31 Claims, 6 Drawing Sheets

FIG. 3
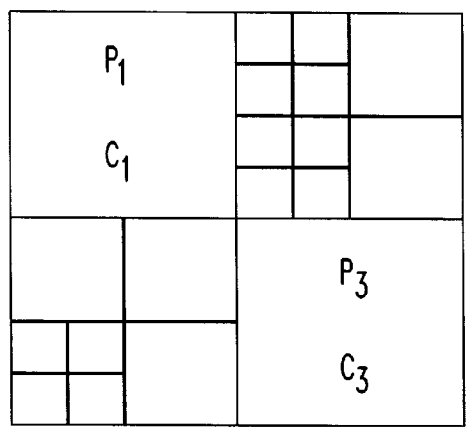
FIG. 4(a)  FIG. 4(b)  FIG. 4(c)
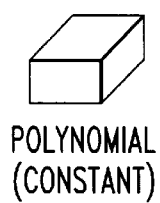  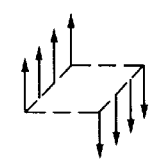  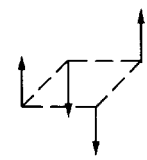
POLYNOMIAL (CONSTANT)   X DERIVATIVE   Y DERIVATIVE (OF X DERIVATIVE)
FIG. 5(a)  FIG. 5(b)  FIG. 5(c)  FIG. 5(d)
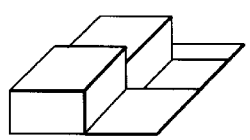  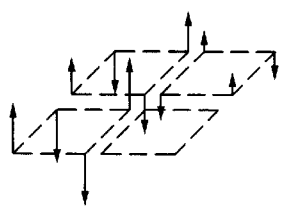  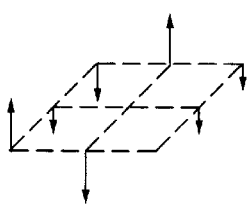  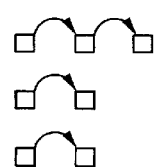
POLYNOMIAL COVERING (CONSTANTS)   DERIVATIVES   COMBINED   SORTED LIST REPRESENTATION

EFFICIENT CONVOLUTIONS USING POLYNOMIAL COVERS

Priority of Provisional Application Serial No. 60/080,477, filed Apr. 2, 1998, is hereby claimed.

BACKGROUND OF THE INVENTION

The present invention relates to efficient convolutions using polynomial covers and, more particularly, to an efficient method for pattern recognition and feature extraction using low degree polynomial covers for region approximation.

In pattern recognition, convolution is an important tool because of its translation invariance properties. Feature extraction is a typical example: the distance between a small pattern (i.e., the feature) is computed at all positions (i.e., translations) inside a large pattern (image). The resulting "distance image" is typically obtained by convolving the feature template with the larger pattern. There are many ways to perform this convolution. For example, a multiplication of the images (of the same size) in the Fourier domain corresponds to a convolution of the two images in the original domain. This Fourier method requires KN log N operations just to go in to and out of the Fourier domain (where N is the number of pixels in the image and K is a constant). Such a method is not appropriate for situations where the feature is small (e.g., 5×5 pixels) with respect to the image (e.g., 32×32 pixels).

In most feature extraction applications, the features are somewhat distorted in the original image (due to noise being present in the image) and the feature extraction process can be somewhat approximated without affecting the performance of the result. For example, the result of the convolution may be quantized or subjected to a threshold value to yield the presence and location of distinctive features. A complete discussion of this particular prior art feature extraction process may be found in an article entitled "Convolutional networks for images, speech, and time-series", by Y. LeCun et al., appearing in *The Handbook of Brain Theory and Neural Networks*, M. A. Arbib, ed. 1995. Indeed, it is often possible to quantize the signals before the convolution step with negligible degradation in performance.

SUMMARY OF THE INVENTION

The present invention relates to efficient convolutions using polynomial covers and, more particularly, to an efficient method for pattern recognition and feature extraction using low degree polynomial covers for region approximation.

In accordance with the present invention, small and arbitrary features can easily be extracted from a given image by using the following process: (1) approximating both the feature and image by combinations (quantized) of low degree polynomials, (2) differentiating the polynomials until both the feature and image are expressed as a series of impulse functions; (3) convolving the impulse functions; and (4) integrating the convolution, where the positive maximum of the integral corresponds to the desired extracted value. It is an aspect of the present invention that each polynomial is differentiated until expressed as impulse functions, since the convolution of impulses is relatively simple and straightforward, resulting in a relatively efficient method of feature extraction.

In a preferred embodiment of the present invention, the polynomial covers for the image and feature are expressed as rectangular areas that define a quantized representation of the image, where the size of each rectangular region is chosen such that each defined area exhibits an error below a predetermined threshold. Since the boundaries of each region are parallel to the axes, these regions are termed "boxlets". The boxlets may be split recursively, starting from a boxlet that encompasses the entire image, until the error for each boxlet is less than a predetermined value. Such a polynomial cover for the image (and for the feature, if appropriate) yields a minimal number of impulse functions in the differentiation, thus further reducing the complexity of the convolution.

Other and further advantages of the present invention will become apparent during the course of the following discussion and by reference to the accompanying drawings.

BRIEF DESCRIPTION OF THE DRAWINGS

Referring now to the drawings,

FIG. 3 is an illustration of the exemplary recursive polynomial covering process for quantization of an image in accordance with the present invention;

FIG. 4 contains a series of two-dimensional representations of the extraction process of the present invention for a single boxlet;

FIG. 5 contains a series of two-dimensional representations of the extraction process of the present invention for a set of four boxlets;

DETAILED DESCRIPTION

As will be discussed in detail below, the feature extraction process of the present invention is based on the premise that a small feature (represented by the function $g(.)$) can be extracted from a relatively large image (represented by the function $f(.)$) by convolving the two functions (thinking of the feature as representing a "filter" for the image). Assuming that $f^n$ denotes the nth integral of $f$ (or the nth derivative if n is negative), the convolution identity can be expressed as follows:

$$(f*g)^n = f^n * g = f * g^n, \qquad (1)$$

where "*" denotes the convolution operation. As will be discussed below, an important feature of the present invention is the utilization of impulse functions to simplify the convolution operation. It is well-known that the convolution of impulse functions can be expressed as follows:

$$\delta_a^n * \delta_b^m = \delta_{a+b}^{m+n}, \qquad (2)$$

where $\delta_a^n$ denotes the nth integral of the impulse function, translated by a. In accordance with the feature extraction process of the present invention, where the features (the "filters") are small and arbitrary, the convolution of the image and the feature may be processed quickly and efficiently by quantizing the image and the feature to combinations of low degree polynomials. These low degree polynomials are then differentiated into impulse functions, convolved and integrated. In summary, the process of the present invention may be expressed by the following:

$$f*g \approx F*G = (F^{-n}*G^{-m})^{m+n}, \quad (3)$$

where F and G are polynomial approximations of $f$ and $g$ (of degree $d_f = n-1$ and $d_g = m-1$), such that $F^{-n}$ and $G^{-m}$ can be written as sums of impulse functions and their derivatives.

Figure 1:
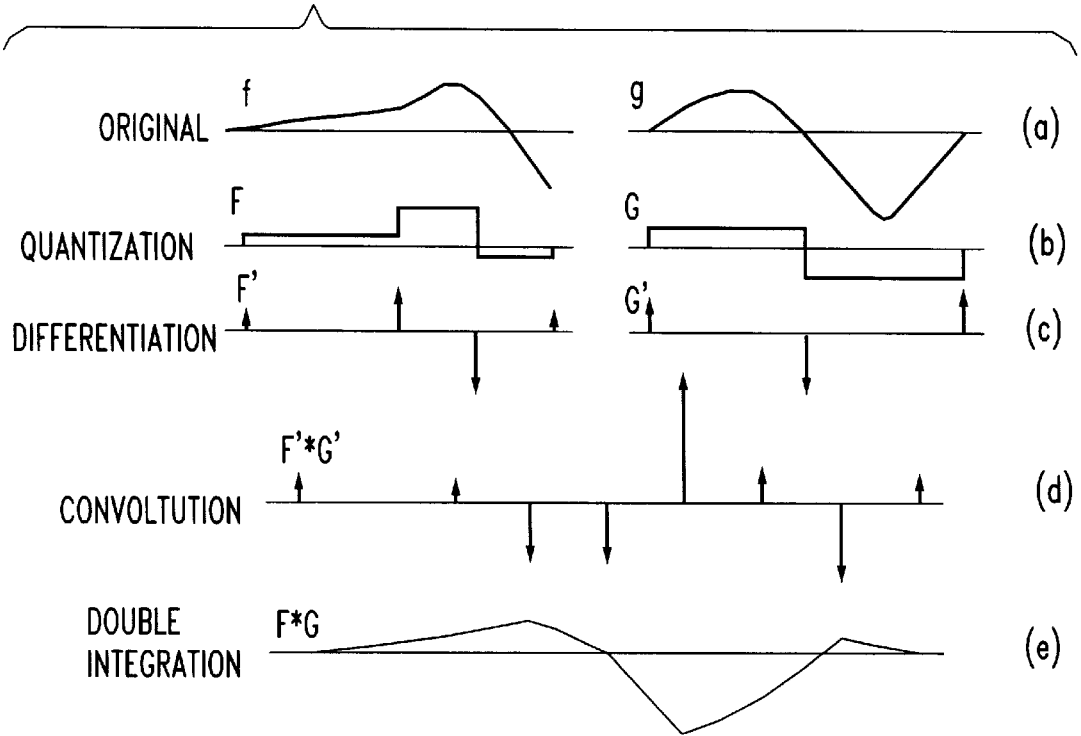
FIG. 1 contains a series of one-dimensional representations of the extraction process of the present invention.

FIG. 1 illustrates a one-dimensional expression of the process of the present invention. The original "image" $f(x)$ and "feature" $g(x)$ are illustrated on line (a) of FIG. 1. The quantized representations of these functions, denoted F(x) and G(x) are shown on line (b) of FIG. 1. A more thorough discussion on an exemplary process of obtaining these quantizations will follow in association with FIG. 3. As shown in FIG. 1, the quantized representations F(x) and G(x) are piecewise constant approximations, that is, polynomials of degree 0 ($d_f = d_g = 0$). In accordance with the present invention, each function is then differentiated d+1 times, where d is either $d_f$ or $d_g$. Therefore, F(x) and G(x) are each differentiated once, resulting in the set of impulse functions shown in line (c) of FIG. 1. This set of impulse functions is relatively easy to convolve, using equation (2) as defined above, and yields the set of impulse functions shown in line (d) of FIG. 1. The result of the convolution is then integrated twice ($d_f+1+d_g+1=2$) to yield the following:

$$F*G = (F^{-1}*G^{-1})^2, \quad (4)$$

illustrated at line (e) of FIG. 1. The positive maximum of this double integration corresponds to the position where the two functions are most correlated and thus yields the feature extraction information.

Figure 2:
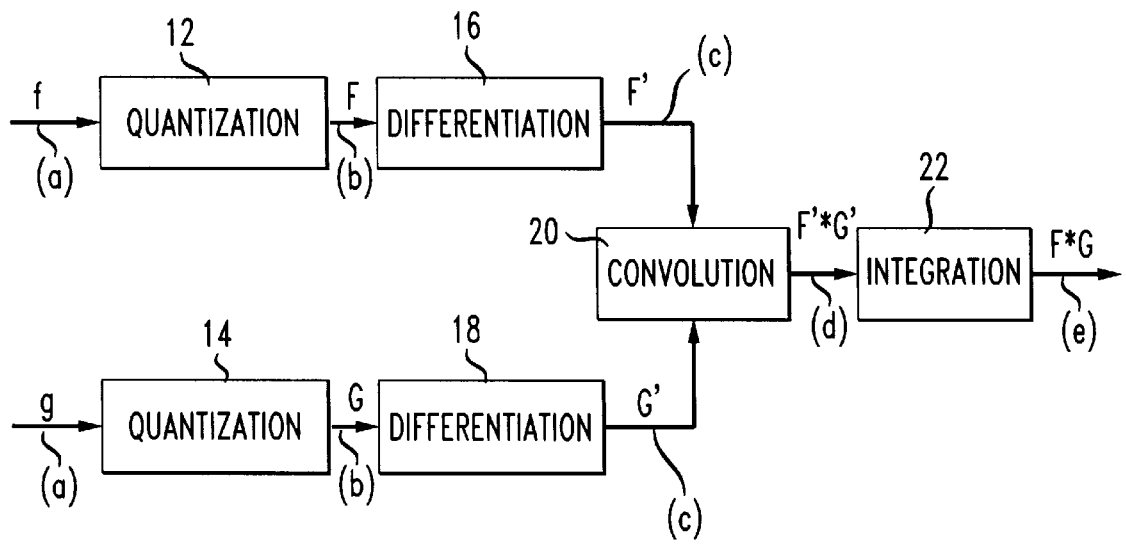
FIG. 2 is a block diagram of the process outlined in FIG. 1.

A block diagram of the process as described thus far is shown in FIG. 2. An exemplary feature extraction system 10 of the present invention receives as inputs a pair of functions, a first function $f( )$ representing, for example, the "image" and a second function $g( )$ representing, for example, the "feature". The image function $f( )$ is applied as an input to a first quantizer 12 and generates as an output the quantized function F( ). Similarly, feature function g( ) is applied as an input to a second quantizer 14 and generates as an output the quantized function G( ). Thereafter, the quantized functions are differentiated in parallel, quantized function F( ) applied as an input to differentiator 16 and quantized function G( ) applied as an input to differentiator 18. The outputs from differentiators 16,18, denoted F'( ) and G'( ), are then applied as inputs to a convolver 20 to produce the convolution F*G as shown at line (d) in FIG. 1. It is to be noted that the differentiation process can be considered as merely a change in the representation of the image information, since in performing this operation, the magnitude of the impulse functions are computed from polynomials in closed form. That is, there is no loss of information in performing the differentiation when compared with the polynomial approximations of the image. Referring back to FIG. 1, the next step in the process is to find the feature extraction information. In particular, the convolved signal F*G is twice integrated in integrator 22 and produces the output $(F*G)^2$ as shown in line (e) of FIG. 1.

Various embodiments of system 10 may comprise digital signal processor (DSP) hardware, read-only memory (ROM) for storing the processing operations and random access memory (RAM) for storing the DSP results.

The example described thus far is a fairly simple, one dimensional problem that uses 0-degree polynomials. In most applications, at least a two-dimensional feature extraction is involved. In these instances, there needs to be an efficient way to approximate the image $f$ by a "cover" of polynomials of degree d suitable for convolution (that is, relatively low degree polynomials). In general, there is the need to find the polynomials that produce the least error e between the approximation and the actual image. If S defines the space on which the image $f$ exists, the "cover" $C = \{c_i\}$ can be defined as a partition of S, where each $c_i$ is separate and distinct—there is no "overlap" between each component of the cover. For each $c_i$, $p_i$ is a polynomial of degree d which minimizes, for example, the following error equation:

$$e_i = \int_{x \in G_i} (f(x) - p_i(x))^2 dx \quad (5)$$

It is to be understood that this particular error function is exemplary only, and any suitable "error measure" (for example, $|f(x) - p(x)|$) may be used, where any appropriate measure is considered to fall within the spirit and scope of the present invention. The problem is to find a cover C which minimizes both the number of separate $c_i$ and $\Sigma_i e_i$. Since each region will be differentiated and then integrated along the directions of the axes, the boundaries of $c_i$s are restricted to be parallel to the axes. Accordingly, $c_i$ is defined in terms of rectangular areas, hereinafter referred to as "boxlets".

In accordance with a preferred embodiment of the present invention, a polynomial cover may be formed that uses a relatively simple process of recursively "splitting" boxlets, starting with a single boxlet to cover the entire image. Reference is made to FIG. 3 which demonstrates this process. In particular, the first partition splits the image in quarters, measuring $e_i$ for each quarter against a predetermined error "threshold" K. If $e_i < K$, the boxlet is of a correct size for the cover and the partitioning process is stopped. Assuming, in the first instance, that $e_i$ remains greater than K after the first split, the splitting process continues within each "boxlet". Referring to FIG. 3, it is seen that $e_1 < K$ and $e_3 < K$, so the partition process is halted for these regions and the polynomials $p_1$ and $p_3$ are defined. The partitioning process continues in the remaining regions until $e_i < K$ is satisfied everywhere. It is to be understood that the final number of boxlets is a function of where the threshold K is set. This aspect will be addressed later on in the discussion of the present invention. It is an advantage of the recursive embodiment of the present invention that the reduction in the number of boxlets functions reduces the number of impulse functions in the associated derivative. However, it is to be understood that various other polynomial covers may be used (such as a straightforward partition of the image into like-sized boxlets, where the size is chosen such that the smallest feature is suitably partitioned to provide minimal error). An alternative boxlet cover may start at a corner of the image, finding the largest boxlet below the predefined error criteria and proceeding across and down the image until the entire image is covered.

Figure 6:
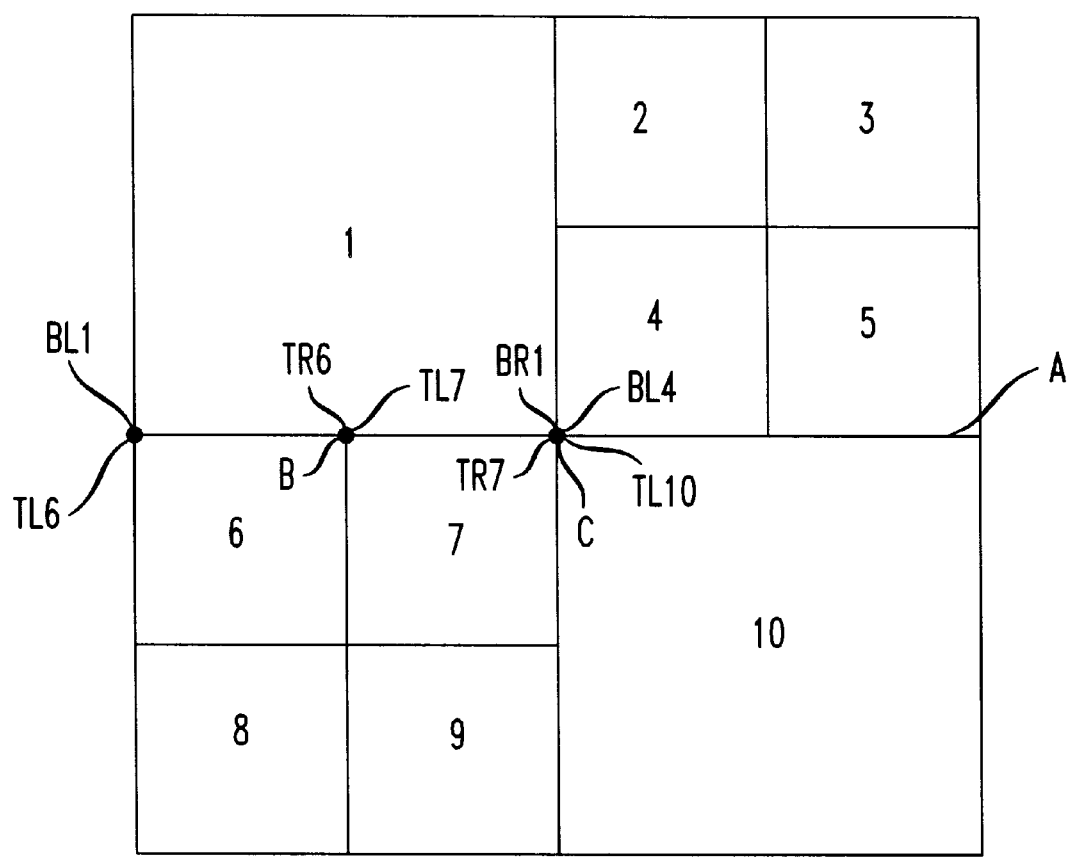
FIG. 6 contains a set of boxlets illustrating the process of summing a set of impulse functions along a given location within the image.

Once an appropriate cover has been determined, the $(n+1)^{st}$ derivative of each polynomial (of degree n) associated with each boxlet must be found. A perspective view of a simple two-dimension polynomial and its associated derivative is illustrated in FIG. 4. Here, the "cover" C is a constant (a single rectangular boxlet), resulting in a first derivative consisting of impulse functions in the X and Y directions as indicated. In particular, FIG. 4(b) illustrates the X derivative of the boxlet, and FIG. 4(c) illustrates the Y derivative of the X derivative, where as shown in FIG. 4(c) this derivative yields impulse functions at each corner, alternating in sign between each corner. FIG. 5 then follows on, illustrating a set of four boxlets and the associated derivatives. As shown in FIG. 5(b), each boxlet has its own set of impulse functions at each corner, alternating in sign between each corner. In order to reduce the complexity of the subsequent convolution step, these derivatives can be combined, as shown in FIG. 5(c). For this particular embodiment, the impulse functions at the "inner" corners add to zero. This is not necessarily the case in each arrangement. Finding which impulse functions can be combined is a difficult task since the representation generated by the recursive process does not provide any means for matching the "bottom" corners of the squares on one line, with the "top" corners of squares from below that line. FIG. 6 illustrates an arrangement where it may be useful to combine a number of separately defined, but co-located impulse functions. As shown, a line A through the middle of the image must combine all the impulse functions coming from all the squares adjacent to this line. By convention, the impulse function coming from the bottom left corner of square one may be defined as "BL1". At this location, impulse BL1 must be combined with "TL6" (the impulse function on at the top left corner of square 6). Proceeding along line A, the impulses TR6 and TL7 (at point B) must also be combined. Similarly, a set of four separate impulse functions BR1, BL4, TR7 and TR10 must all be combined at point C. The problem is that in the recursive order, BR1 comes before TL6 (as TR6 comes before TL7) so generating a sorted and compacted list of impulse functions from the recursive procedure is difficult. Sorting these various impulse functions, after putting them in such a list, requires O (P log P) computations steps, where P is the number of impulse functions and is often too expensive and time-consuming. Therefore, a preferred alternative is to review the recursive tree generated from the image and: (1) accumulate all of the "top" corners into a sorted (horizontal) list and (2) accumulate all of the "bottom" corners into a second, sorted (horizontal) list. The horizontal lists corresponding to the same vertical positions can then be merged in O(P) operations. FIG. 5(d) illustrates the sorted list accomplished by this task associated with the polynomial cover of FIG. 5(a).

Once the images have been quantized, differentiated and "compacted" by adding together the various impulse functions as described above, the convolution of the differentials is obtained by summing the various impulse functions. In particular, the two differentials can be expressed as follows:

$$F'(x) = \sum_{i_F=0}^{i_F<d_F} \sum_{j_F} \alpha_{F_{i_F,j_F}} \delta_{a_{F_{j_F}}}^{i_F}(x) \tag{6}$$

$$G'(x) = \sum_{i_G=0}^{i_G<d_G} \sum_{j_G} \alpha_{G_{i_G,j_G}} \delta_{a_{G_{j_G}}}^{i_G}(x), \tag{7}$$

where $i_F$ and $i_G$ represent the order of each of the impulse function's derivative, and $j_F$ and $j_G$ are iterating over all of the impulse functions in compact form. The values $$\alpha_{F_{i_F,j_F}}$$

and $$\alpha_{G_{i_G,j_G}}$$

represent the coefficients which multiply each of the of impulse functions. The convolution F'*G' is then easily computed using the following:

$$F' * G' = \sum_{i_F=0}^{i_F<d_F} \sum_{j_F} \sum_{i_G=0}^{i_G<d_G} \sum_{j_G} \alpha_{F_{i_F,j_F}} \alpha_{G_{i_G,j_G}} \delta_{a_{F_{j_F}}+a_{G_{j_G}}}^{i_F+i_G}(x) \tag{8}$$

Lastly, F*G is computed from F'*G' using a straightforward integration process. For two-dimension images, and linear polynomials for F and G (i.e., $d_f=d_g=1$), a set of four integrations would be required (i.e., $d_f+d_g+2$) in each direction (that is, in X and Y).

Figure 7A:
FIG. 7 contains a set of images illustrating the process of the present invention.
Figure 7B:
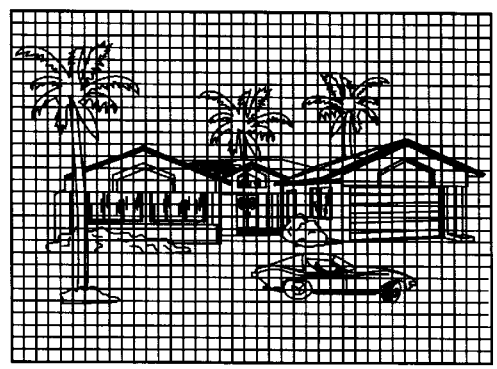
Figure 7C:
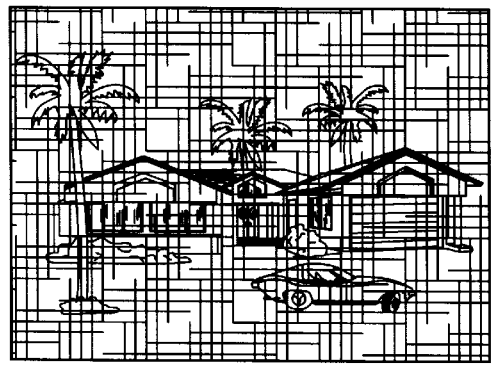
Figure 7D:
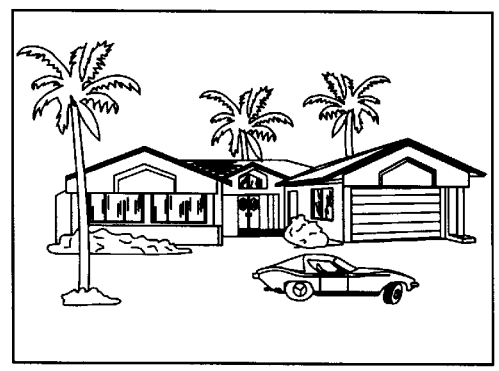

The speed of the convolution of the present invention may be tested with a feature extraction exercise. FIG. 7(a) shows a typical image, with FIG. 7(b) illustration the quantization of the image using the recursive boxlet process of the present invention (with an error threshold of 10,000). The integration result is shown in FIG. 7(c). In general, the quantization of the image is done with constant polynomials, and with error thresholds that may vary from 1,000 to 40,000 (as an example for the maximum error for $e_i$, assuming each pixel can take a value between 0 and 255). This range corresponds to varying the pixel-to-impulse function ratio from 2.3 to 13.7. Since the feature is not quantized, these ratios correspond exactly to the ratios of the number of multiply-adds for the standard convolution versus the boxlet convolution. The actual speed up factors are summarized below in Table 1.

TABLE 1

| | Image | | | Feature | | | |
|---|---|---|---|---|---|---|---|
| | | Impls | | | | | |
| Threshold | Boxlets | fncs | Ratio | 5 × 5 | 10 × 10 | 15 × 15 | 20 × 20 |
| 1,000 | 125,685 | 144,250 | 2.3 | 1.5 | 2.2 | 2.4 | 2.4 |
| | | | | 2.3 | 2.6 | 2.6 | 2.5 |
| 5,000 | 68,994 | 84,382 | 4.0 | 2.3 | 3.2 | 3.8 | 4.0 |
| | | | | 3.8 | 3.8 | 4.0 | 4.0 |
| 10,000 | 47,253 | 58,120 | 5.8 | 2.8 | 4.8 | 5.4 | 5.5 |
| | | | | 4.7 | 6.0 | 6.1 | 5.9 |
| 40,000 | 20,244 | 24,661 | 13.7 | 5.2 | 9.2 | 11.3 | 12.4 |
| | | | | 8.4 | 12.5 | 13.4 | 13.8 |

In the "feature" column, the first line corresponds to the ratio of a full convolution (as many multiply-adds as if the product of the number of pixels in the image times the number of pixels in the feature) with the full (quantization and convolution and integration) boxlet convolution. The second line does not count the quantization. The improved ratio in the second line illustrates that if multiple features are to be extracted from the same image, the quantization of the image need only be done once, thus allowing the remaining feature extractions to be much faster.

Figure 8A:
FIG. 8 illustrates a pattern matching implementation of the present invention for binary images.
Figure 8B:
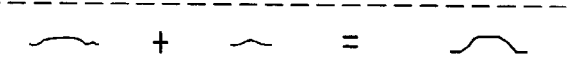
Figure 8C:
Figure 8D:
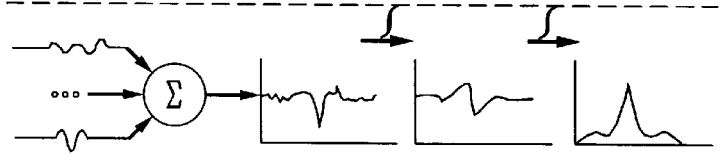
Figure 9A:
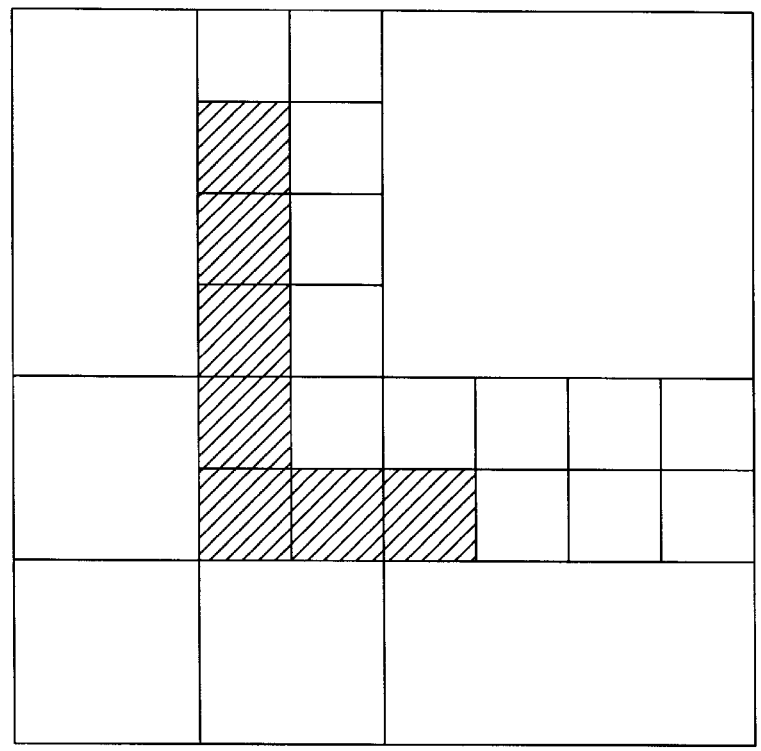
FIG. 9 illustrates a binary image and its associated compact impulse function encoding.
Figure 9B:
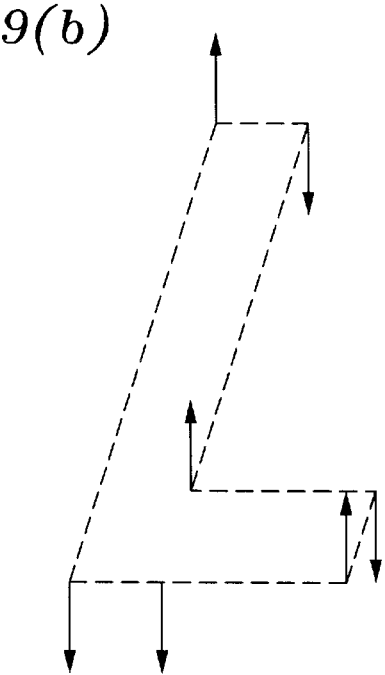

The first step in the process of the present invention (finding a cover of low degree polynomials) may be simplified when used with a binary image. In this case, the threshold K is set to zero and "constant" polynomials can be used. If only the X derivative is considered, the impulse representation is equivalent to run-length encoding. In particular, the position of each positive impulse function denotes the beginning of a "run", while the position of each negative impulse function denotes the end of the "run". The horizontal convolution can be computed efficiently using the boxlet representation of the present invention. FIG. 8 illustrates the process of the present invention as related to pattern matching with binary images using horizontal convolution. As shown in FIG. 8(a), the distance between the two binary images is to be evaluated at each horizontal position. The result is obtained by convolving each horizontal line and by computing the sum of each of the convolution functions. The convolution of two exemplary runs is illustrated in FIG. 8(b), with the summation of all of the convolutions of the two runs is shown in FIG. 8(c). If an impulse representation is used for the runs (a first derivative), each summation of a convolution requires only four additions of impulse functions, as shown in FIG. 8(d). The result is then integrated twice, as shown in FIG. 8(d) to generate the required information with respect to the match between the patterns. The results obtained in FIGS. 8(a) and 8(d) are identical, except that the use of the present invention in FIG. 8(d) yields the result with much fewer operations. In two dimensions, the concept of binary image encoding utilizing the techniques of the present invention generalizes well, as shown in FIG. 9. It is clear from FIG. 9 that the speed-up associated with run-length encoding comes from the frequent cancellations of impulse functions at adjacent boxlets. In particular, the number of impulse functions is proportional to the contour length of the binary shape, in this case an "L".

Figure 10:
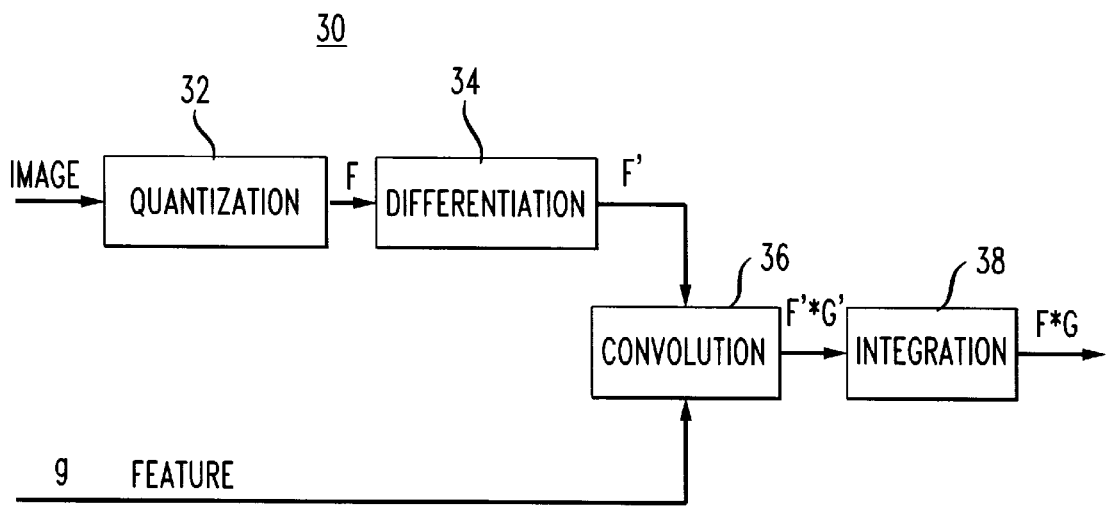
FIG. 10 contains a diagram of a one-sided boxlet convolution arrangement of the present invention.

When one of the images is extremely small with respect to the other, it is likely that quantizing (i.e., finding a polynomial "cover") for this image will either corrupt the result of the convolution, or will not appreciably reduce the number of impulse functions sufficiently to compensate for the overhead introduced by the various steps related to developing the polynomial cover and the compaction of the convolution. The process of the present invention may still be invoked for the larger image, performing a "one-sided" boxlet convolution as shown in FIG. 10. This arrangement of the present invention is particularly useful in the extraction of extremely small features (for example, 5 by 5 pixels) that are very rich in information. Referring to FIG. 10, one-sided boxlet convolution arrangement 30 uses as inputs the image function $f(x)$ and the feature $g(x)$. The large image is first processed to generate an appropriate low degree $(d_f)$ polynomial cover $F(x)$ within a quantizer 32. This approximation is then differentiated $d_f+1$ times within a differentiator 34 to produce a set of impulse functions denoted $F'(x)$. The feature $g(x)$ that is not quantized is defined, for the purpose of the subsequent convolution operation, as if each pixel was one impulse function. These representations are subsequently applied as inputs to convolver 36 to provide a summation of the impulse pulses of the image and feature. In accordance with the teachings of the present invention, this convolution result is thereafter integrated $d_f+1$ times to provide the information related to extraction of the feature from the image.

When convolutions are used for feature extraction, precision may be sacrificed for speed with negligible degradation in performance. The boxlet convolution method of the present invention combines quantization and convolution to offer a continuous adjustable trade-off between accuracy and speed. The process of the present invention is directly applicable to the forward propagation in convolutional neural networks and in pattern matching when translation invariance results from the use of convolution.

What is claimed is:

1. An image processing arrangement for comparing a first image ($f(x)$) to a second image ($g(x)$), the arrangement comprising a first quantizer for receiving as an input the first image and generating an approximation thereof defined as a polynomial first image cover having a predetermined degree $d_f$, said first cover defined by a plurality of non-overlapping cover regions $c_i$;

a second quantizer for receiving as an input the second image and generating an approximation thereof defined as a polynomial second image cover having a predetermined degree $d_g$, said second cover defined by a plurality of non-overlapping cover regions $c_j$;

a first differentiator receiving as an input the first polynomial of degree $d_f$ and differentiating said first polynomial $d_f+1$ times to generate an impulse response representation of said first image;

a second differentiator receiving as an input the second polynomial of degree $d_g$ and differentiating said second polynomial $d_g+1$ times to generate an impulse response representation of said second image;

a convolver responsive to the first and second impulse response representations for summing said impulse functions to generate a convolution representation of said first and second images; and an integrator responsive to the convolution output from the convolver for integrating said convolution $((d_f+1+dg+1)=d_f+d_g+2)$ times to generate as an output the pattern information related to the first and second images.

2. An image processing arrangement as defined in claim 1 wherein the first quantizer generates a polynomial cover $F(x)$ which minimizes a predetermined error relation $e_{ci}(f(x),p(x))$.

3. An image processing arrangement as defined in claim 2 wherein the predetermined error relation is defined by $$e_i = \int_{x \in c} (f(x) - p_i(x))^2 \, dx$$

for each cover region $c_i$.

4. An image processing arrangement as defined in claim 2 wherein the first polynomial cover comprises a set of non-overlapping rectangular areas.

5. An image processing arrangement as defined in claim 4 wherein the arrangement further comprises a compactor for evaluating the plurality of impulse functions associated with the non-overlapping rectangular areas and summing the values of co-located impulse functions to reduce the number of separate impulse functions.

6. An image processing arrangement as defined in claim 1 wherein the second quantizer generates a polynomial cover $G(x)$ which minimizes a predetermined error measure $e_{ci}(g(x),p(x))$.

7. An image processing arrangement as defined in claim 6 wherein the predetermined error measure is $$e_i = \int_{x \in c} (g(x) - p_i(x))^2 \, dx$$

for a predetermined value of $e_i$.

8. An image processing arrangement as defined in claim 6 wherein the second polynomial cover comprises a set of non-overlapping rectangular areas.

9. An image processing arrangement as defined in claim 6 wherein the arrangement further comprises a compactor for evaluating the plurality of impulse functions associated with the non-overlapping rectangular areas and summing the values of co-located impulse functions to reduce the number of separate impulse functions.

10. A method of extracting signal information from a pair of images, the pair of images defined by a first image $f(x)$ and a second image $g(x)$, the method comprising the steps of:

a) quantizing each image by defining a cover for each image comprising a series of low degree polynomials of degree $d_f$ and $d_g$, respectively, said quantized representations defined as F(x) and G(x), respectively;

b) differentiating each quantized representation, the first quantized representation F(x) differentiated $d_f$+1 times and the second quantized representation G(x) differentiated $d_g$+1 times, each differentiating generating an impulse response representation of each image, to form F'(x) and G'(x), respectively;

c) convolving the impulse response representations of F'(x) and G'(x) to generated F'(x)*G'(x); and d) integrating the convolution F'(x)*G'(x) ($d_f$+1+dg+1) times to generate as an output the pattern information related to the first and second images.

11. A signal information extraction method as defined in claim 10 wherein in performing step a), a predetermined error measure eci(f(x),p(x)) is used to assess the quantization process.

12. A signal extraction method as defined in claim 11 wherein in performing step a), the following predetermined error measure is used $$e_i = \int_{x \in c} (f(x) - p_i(x))^2 \, dx$$

to define the quantized representation F(x) for a predetermined error $e_i$.

13. A signal information extraction method as defined in claim 10 wherein in performing step a), a plurality of non-overlapping rectangular cover polynomials are defined for F(x).

14. A signal information extraction method as defined in claim 13 wherein the method further comprises the step of summing the impulse response representations of the plurality of non-overlapping rectangular cover polynomials generated in step b) prior to convolving the differentials F'(x) and G'(x).

15. A signal information extraction method as defined in claim 13 wherein each non-overlapping rectangular area is defined using a recursive process, beginning with a rectangular area equal to the image size and recursively dividing each rectangular error in half until an error threshold is obtained.

16. A signal information extraction method as defined in claim 10 wherein in performing step a), a predetermined error measure $e_{ci}$(g(x),p(x)) is used to assess the quantization process.

17. A signal information extraction method as defined in claim 16 wherein the predetermined error measure is defined as $$e_i = \int_{x \in c} (g(x) - p_i(x))^2 \, dx$$

and used define the quantized representation G(x) for a predetermined error $e_i$.

18. A signal information extraction method as defined in claim 10 wherein in performing step a), a plurality of non-overlapping rectangular cover polynomials are defined for G(x).

19. A signal information extraction method as defined in claim 18 wherein the method further comprises the step of summing the impulse response representations of the plurality of non-overlapping rectangular cover polynomials generated in step b) prior to convolving the differentials F'(x) and G'(x).

20. A signal information extraction method as defined in claim 18 wherein each non-overlapping rectangular area is defined using a recursive process, beginning with a rectangular area equal to the image size and recursively dividing each rectangular error in half until an error threshold is obtained.

21. An image processing arrangement for comparing a first image (f(x)) to a second image (g(x)), the first image being larger than the second image and the second image defined a plurality of separate impulse functions for each pixel within said second image, the arrangement comprising a quantizer for receiving as an input the first image and generating an approximation thereof defined as a polynomial image cover having a predetermined degree $d_f$, said first cover defined by a plurality of non-overlapping cover regions $c_i$;

a differentiator receiving as an input the polynomial of degree $d_f$ and differentiating said polynomial $d_f$+1 times to generate an impulse response representation of said first image;

a convolver responsive to the impulse response representation of said first image generated by said differentiator and the plurality of separate impulse functions of said second image for summing said impulse functions to generate a convolution representation of said first and second images; and an integrator responsive to the convolution output from the convolver for integrating said convolution ($d_f$+1) times to generate as an output the pattern information related to the first and second images.

22. An image processing arrangement as defined in claim 21 wherein the quantizer generates a polynomial cover F(x) which minimizes a predetermined error measure $e_{ci}$(f(x),p(x)).

23. An image processing arrangement as defined in claim 22 wherein the predetermined error measure is defined as follows:

$$e_i = \int_{x \in c} (f(x) - p_i(x))^2 \, dx$$

for each cover region $c_i$.

24. An image processing arrangement as defined in claim 21 wherein the polynomial cover comprises a set of non-overlapping rectangular areas.

25. An image processing arrangement as defined in claim 21 wherein the arrangement further comprises a compactor for evaluating the plurality of impulse functions associated with the non-overlapping rectangular areas with the plurality of impulse functions of the second image and summing the values of co-located impulse functions to reduce the number of separate impulse functions.

26. A method of extracting signal information from a pair of images, the pair of images defined by a first image f(x) and a second image g(x), the second image being smaller than the first image and represented by a plurality of impulse functions for each pixel within said second image, the method comprising the steps of:

a) quantizing the first image by defining a cover for said first image comprising a series of low degree polynomials of degree $d_f$, said quantized representation defined as F(x), respectively;

b) differentiating said quantized representation $d_f$+1 times to generate an impulse response representation of said first image, defined as F'(x);

c) convolving the impulse response representation F'(x) with the plurality of impulse functions of the second image to generate F'(x)*g(x); and d) integrating the convolution F'(x)*g(x) (d_f+1) times to generate as an output the pattern information related to the first and second images.

27. A signal information extraction method as defined in claim 26 wherein in performing step a), a predetermined error measure $e_{ci}(f(x),p(x))$ is used to defined the quantized representation F(x).

28. A signal information extraction method as defined in claim 27 wherein in performing step a), the predetermined error measure is defined as $$e_i = \int_{x \in c} (f(x) - p_i(x))^2 \, dx.$$

29. A signal information extraction method as defined in claim 26 wherein in performing step a), a plurality of non-overlapping rectangular cover polynomials are defined for F(x).

30. A signal information extraction method as defined in claim 29 wherein the method further comprises the step of summing the impulse response representations of the plurality of non-overlapping rectangular cover polynomial generated in step b) with the impulse response representation of said second image prior to performing the convolving step.

31. A signal information extraction method as defined in claim 29 wherein each non-overlapping rectangular area is defined using a recursive process, beginning with a rectangular area equal to the image size and recursively dividing each rectangular error in quarters until an error threshold is obtained.

* * * * *